(12) United States Patent
Trebes et al.

(10) Patent No.: US 10,226,855 B2
(45) Date of Patent: Mar. 12, 2019

(54) CLAMPING UNIT

(71) Applicant: Narr Beteiligungs GmbH, Kirchheim/Teck (DE)

(72) Inventors: Herbert Trebes, Schorndorf (DE); Paul Brosowsky, Uhingen (DE)

(73) Assignee: Narr Beteiligungs GmbH, Kirchheim/Teck (DE)

( * ) Notice: Subject to any disclaimer, the term of this patent is extended or adjusted under 35 U.S.C. 154(b) by 99 days.

(21) Appl. No.: 15/641,356

(22) Filed: Jul. 5, 2017

(65) Prior Publication Data

US 2018/0009085 A1 Jan. 11, 2018

(30) Foreign Application Priority Data

Jul. 5, 2016 (EP) ..................... 16177888

(51) Int. Cl.
*B25B 1/10* (2006.01)
*B25B 1/24* (2006.01)
*B25B 5/10* (2006.01)
*B25B 5/16* (2006.01)
*B23B 31/28* (2006.01)

(52) U.S. Cl.
CPC ............. *B25B 1/106* (2013.01); *B23B 31/28* (2013.01); *B25B 1/24* (2013.01); *B25B 5/10* (2013.01); *B25B 5/16* (2013.01)

(58) Field of Classification Search
CPC .. B25B 1/106; B25B 1/24; B25B 5/10; B25B 5/16; B23B 31/28
USPC ........................................................ 269/225
See application file for complete search history.

(56) References Cited

U.S. PATENT DOCUMENTS

| | | | | |
|---|---|---|---|---|
| 3,386,726 A * | 6/1968 | Lorenz | ...................... | B23B 5/12 269/218 |
| 4,563,824 A * | 1/1986 | Baun | ........................ | G01B 7/31 33/552 |
| 4,773,636 A * | 9/1988 | Takahashi | ............... | B25B 1/106 269/221 |
| 4,995,599 A * | 2/1991 | Pfluger | ................... | B25B 1/103 269/207 |
| 7,618,030 B2 * | 11/2009 | Yonezawa | ............. | F15B 15/068 269/24 |
| 8,152,148 B2 * | 4/2012 | Kipping | ............... | B23Q 16/026 269/32 |
| 8,152,151 B2 * | 4/2012 | Sandmeier | .......... | B23B 31/1078 269/20 |
| 9,033,324 B2 * | 5/2015 | Chou | ..................... | B23Q 3/082 269/228 |
| 9,067,306 B1 * | 6/2015 | Lee | .......................... | B25B 1/24 |
| 2007/0069439 A1 * | 3/2007 | McIntosh | ................ | B25B 5/087 269/32 |
| 2014/0070500 A1 * | 3/2014 | Fankhauser | ............... | B27B 5/32 279/141 |

(Continued)

*Primary Examiner* — George B Nguyen
(74) *Attorney, Agent, or Firm* — Michael Soderman

(57) ABSTRACT

A clamping unit (1) for clamping a workpiece, with an electric drive, and a gearbox unit having an arrangement of rolling elements (9). The gearbox unit is used to convert a rotary motion of an actuating element into a translational motion. By means of translational motions of the actuating element, clamping elements (5) can be moved into a clamping position in which a workpiece is clamped with clamping elements (5), and into a release position in which clamping elements (5) release the workpiece.

17 Claims, 4 Drawing Sheets

(56) References Cited

U.S. PATENT DOCUMENTS

2014/0110908 A1* 4/2014 Fankhauser ............ B23D 51/10
279/141

* cited by examiner

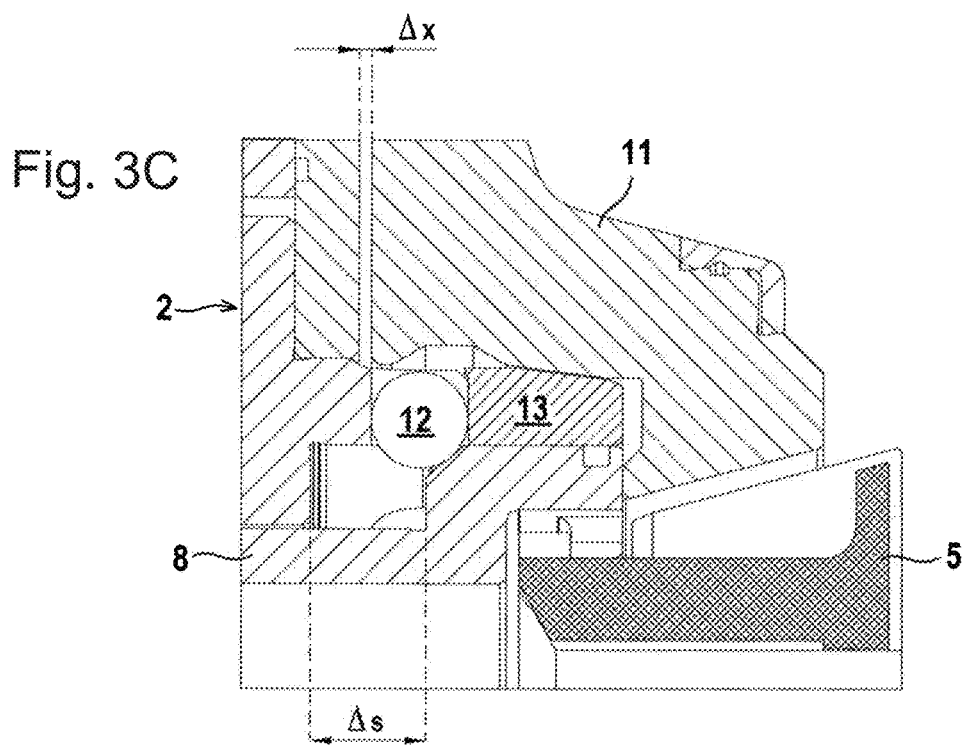

CLAMPING UNIT

CROSS REFERENCE TO RELATED APPLICATIONS

This application claims the priority of EP 16177888.1 filed on Jul. 5, 2016; this application is incorporated by reference herein in its entirety.

BACKGROUND

The invention relates to a clamping unit.

Such clamping units are generally used for the stationary clamping of workpieces in drilling and milling machines as well as in machining centres, and also for actuating chucks for workpieces in rotary machining processes on lathes, grinding and indexing machines.

Clamping units of the type mentioned typically have hydraulic drive units for generating the clamping forces required for clamping or releasing workpieces. Such hydraulic units have, however, in addition to their high level of engineering effort, the disadvantage that these units respond relatively slowly to switching signals so that there is a problem with applications in which, for example, for reasons of productivity, very fast and precise clamping system motions are required for performing clamping processes or releasing processes.

From DE 20 2013 101 345 U1, a magnetic clamping device is known which has a clamping surface, at least one electromagnetic means of clamping for clamping a workpiece on the clamping surface, and a centering device for centering the workpiece, wherein the centering device has at least one primary clamping jaw that is slidable within the clamping surface. Associated with the primary clamping jaw is a clamping jaw that is movable into a lowered or raised position relative to the clamping surface. The clamping jaw has a separate drive, in particular, a pneumatic, hydraulic, mechanical, magnetic, in particular an electromagnetic, electromotive or manual lift drive. The use of electromotive drives is mentioned there only summarily.

SUMMARY

The invention relates to a clamping unit (1) for clamping a workpiece, with an electric drive, and a gearbox unit having an arrangement of rolling elements (9). The gearbox unit is used to convert a rotary motion of an actuating element into a translational motion. By means of translational motions of the actuating element, clamping elements (5) can be moved into a clamping position in which a workpiece is clamped with clamping elements (5), and into a release position in which clamping elements (5) release the workpiece.

DETAILED DESCRIPTION

The task of the invention is to provide a clamping unit that has high functionality while requiring little engineering effort.

For solving this task, the characteristics of claim 1 have been provided. Advantageous embodiments and useful further developments of the invention are described in the dependent claims.

The invention relates to a clamping unit for clamping a workpiece by means of an electric drive and a gearbox unit having an arrangement of rolling elements. The gearbox unit is used to convert a rotary motion into the translational motion of an actuating element. Translational motions of the actuating element can be used to move clamping elements into a clamping position, in which a workpiece is clamped by means of the clamping elements, and into a release position, in which the clamping elements release the workpiece.

If necessary, the clamping unit may also be embodied such that the actuating element performs rotary motions.

Thus, according to the invention, an electromechanical clamping unit is provided which, while having a compact, cost-effective structure, allows reproducible, precise clamping of workpieces, whereby in particular fast clamping processes can also be precisely performed because the electric drive of the clamping unit—contrary to hydraulic drive units—possesses less inertia.

An essential aspect of the invention consists of the combination of the electric drive with the gearbox unit having an arrangement of rolling elements. This gearbox unit has a compact structure and guarantees precise and reproducible conversion of the rotary motion of the electrical drive's rotor into a translational motion of the actuating element that impinges upon the clamping system. As the rolling elements are in direct engagement with the actuating element and the actuating element impinges immediately on the clamping elements to perform clamping processes, only a low number of components is necessary for converting the rotary motions into translational motions for the workpiece clamping and releasing processes. In this way, the clamping unit has a compact and cost-effective structure.

Another advantage of the invention consists of the fact that the gearbox unit according to the invention effects workpiece clamping both by means of tensile motions as well as rotary motions acting upon the clamping elements, and it is particularly advantageous that, in the tensile and rotary motions, the same forces are generated by the electric drive, so that the same precision is obtained during clamping and releasing with both types of motions.

In one embodiment, in which the clamping processes are achieved by means of rotary motions of the actuating element, the actuating element may be embodied by a pressure sleeve or something similar. In one embodiment, in which clamping is achieved by means of a tensile effect, the actuating element may advantageously be embodied by a pull rod.

According to an advantageous embodiment of the invention, the clamping unit is provided with means of control for monitoring the clamping position and the clamping force exerted during the clamping process on the workpiece to be clamped.

These means of control can be used to electronically control and set both the clamping force and the clamping position. This allows compensating for dimensional variances resulting from tolerance specifications in workpieces and clamping unit components in order to arrive at an optimal and reproducible clamping process for each workpiece.

This significantly increases the functionality of the clamping unit according to the invention.

The means of control prove to be particularly advantageous if a control unit is associated with the electric drive.

The control unit is advantageously implemented as a software module in a computer unit. The computer unit may be integrated into the electric drive or embodied as a separate unit. By specifying target values for the clamping force and the clamping position, the clamping process can be individually matched to each workpiece. Controlling clamping force and/or clamping position allows optimizing the clamping process.

According to a first variant, the control unit is used to provide current control or torque control of the electric drive.

This variant requires an extremely low level of engineering effort as the control processes are performed solely as a function of internal parameters of the electric drive. What is exploited here is the fact that the current and the torque of the electric drive represent characteristic parameters for the workpiece clamping process.

According to a second variant, control is performed as a function of sensor signals from at least one force sensor.

The advantage of this variant is that the force sensors directly and immediately yield a measure for the prevailing clamping force as a measured value based on which a particularly simple control process can be performed.

According to another advantageous embodiment of the invention, at least one sensor is provided for monitoring the clamping position.

In particular, the sensor is a proximity switch or a linear position-measuring system.

These sensors allow detecting, for example, that a workpiece whose actual dimensions vary from the target dimensions is not positioned properly in the clamping position. This is the case, in particular, if the workpiece is somewhat smaller than specified by the target size for this workpiece. The same also applies to the workpiece in the release position. Faulty positions thus detected can then be corrected by a corresponding adjustment of the workpiece position.

According to another advantageous embodiment, means of workpiece system control are provided by means of which the position of the workpiece relative to a contact surface can be controlled.

Advantageously, the means of workpiece system control have an arrangement of inductive or capacitive sensors.

This provides another essential control measure by means of which the clamping process of a workpiece can be further optimized. By these means of workpiece system control it is possible to monitor whether the respective workpiece is correctly in contact with a contact surface. In this case, the inductive or capacitive sensors are advantageously used to measure the distance of the workpiece from the contact surface in different measuring locations. This allows faulty positions of the workpiece to be precisely detected and corrected.

According to an advantageous embodiment of the invention, the maintenance of the clamping force for clamping a workpiece is effected by self-locking of the gearbox unit.

The clamping force is maintained securely by the self-locking of the electric drive even if the electric drive is shut off. This allows the electric drive to remain shut off as long as there are no status changes performed on the clamping unit; this results in significant energy savings.

According to a particularly advantageous embodiment of the invention, the clamping unit has a base module that integrates the electric drive, the gearbox unit, and the actuating element, and it also has an interchangeable insert with the actual clamping system.

Interchangeable inserts with different clamping systems may be mountable on the base module.

The thus configured clamping unit constitutes a modular system that can be easily and flexibly matched to different applications. The modular system is built such that the base module with the electric drive, the gearbox unit, and the actuating element form a universal unit on which different interchangeable inserts can be mounted as application-specific components. The interchangeable inserts have different clamping elements for clamping different workpieces, thus making it possible to provide, in particular, interchangeable inserts for internal clamping and also interchangeable inserts for external clamping of workpieces.

Particularly advantageously, the base module and the interchangeable insert are connected in a reversibly detachable manner by means of a bayonet lock.

This allows attaching an interchangeable insert to the base module, as well as removing it again from the latter, easily and without tools.

According to an advantageous embodiment of the invention, the base module has an arrangement of spheres that are means of forming a clamping connection with the interchangeable insert; and the spheres expediently form an annular configuration arranged symmetrically to the longitudinal axis of the base module.

Engagement of the spheres with the interchangeable insert is effected or cancelled by means of translational motions of the actuating elements.

An essential advantage of this arrangement lies in the fact that the interchangeable insert is clamped tightly to, and thus locked, or released from the base module merely by the motion of the actuating element controlled by the electric drive, so that the interchangeable insert can be removed from the base module by actuating the bayonet lock.

Given a specific positioning of the spheres in the base module, it is guaranteed that, when the clamping system is put in the clamping or release position by the actuating element, the actuating element is in a position relative to the spheres such that the spheres cause clamping of the interchangeable insert so that the latter cannot be released from the base module.

It is not until the actuating element is brought into a third position that differs from the aforementioned first two positions that the interchangeable insert can be released from the base module. This results in convenient operation of the clamping unit, and operating faults can be reliably excluded due to the fact that the actuating element is controlled by the electric drive.

BRIEF DESCRIPTION OF THE DRAWINGS

The invention will be explained below based on the drawings, which show in:

FIG. 3C: Detail view of the clamping unit with the front end of the pull rod and a sphere as a clamping element with the interchangeable insert released

DETAILED DESCRIPTION OF THE PREFERRED EMBODIMENTS

FIGS. 1A through 1C and 2 show an exemplary embodiment of the clamping unit 1 according to the invention for clamping workpieces.

Figure 1C:
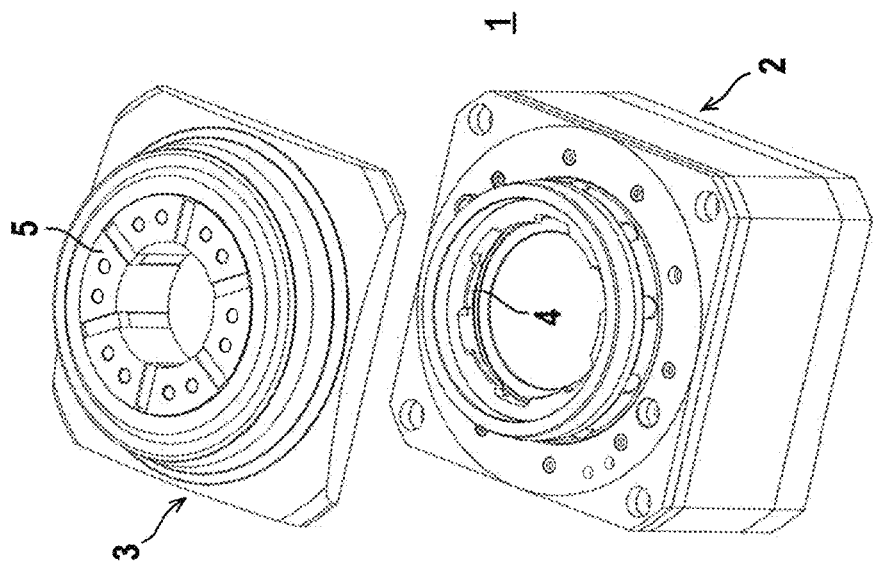
FIG. 1C: Perspective view of the clamping unit with a base module and an interchangeable insert with an interchangeable insert removed from the base module
Figure 1B:
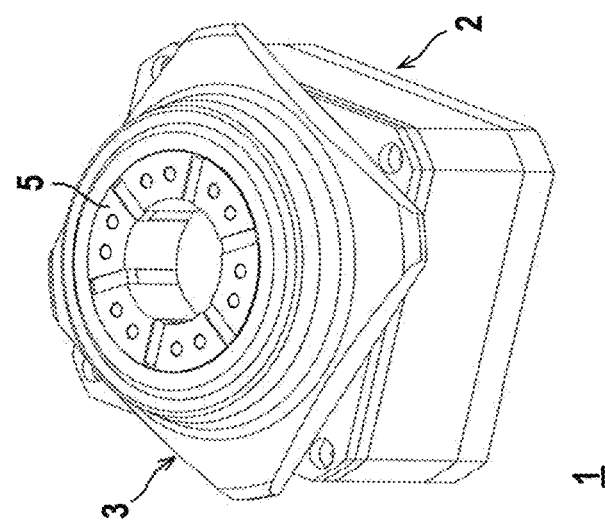
FIG. 1B: Perspective view of the clamping unit with a base module and an interchangeable insert with an interchangeable insert rotated relative to the target position
Figure 1A:
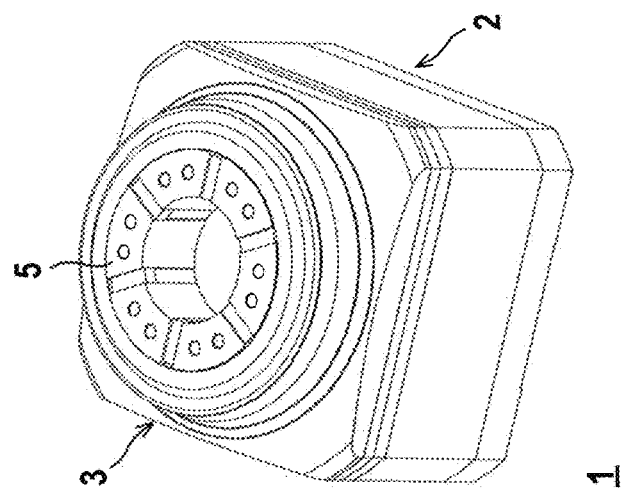
FIG. 1A: Perspective view of the clamping unit with a base module and an interchangeable insert with the interchangeable insert firmly attached to the base module in a target position

As shown, in particular in FIGS. 1A through 1C, clamping unit 1 has a modular structure such that an interchangeable insert 3 can be attached to base module 2 in a reversibly releasable manner. The base module 2 forms a universal module to which different interchangeable inserts 3 can be attached. Interchangeable insert 3 is firmly attached to base module 2 by means of a bayonet lock. In FIG. 1C, locking elements 4 of this bayonet lock are visible on base module 2.

As a rule, each interchangeable insert 3 has several clamping elements 5 for clamping a workpiece. The individual interchangeable inserts 3 differ in the configuration of clamping elements 5. In the example of FIGS. 1A through 1C, clamping elements 5 form a clamping head for the external clamping of a workpiece. Generally, interchangeable inserts 3 can also receive clamping systems whose design and functionality allow internal clamping of the workpiece.

FIG. 1A shows interchangeable insert 3 in its target position on base module 2. When interchangeable insert 3 is attached to base module 2 in this target position, clamping unit 1 is completely mounted for performing workpiece-clamping processes. To release interchangeable insert 3, the latter is rotated relative to base module 2 (FIG. 1B) and then removed (FIG. 1C). Then, for example, a different interchangeable insert 3 can be attached to base module 2.

Figure 2:
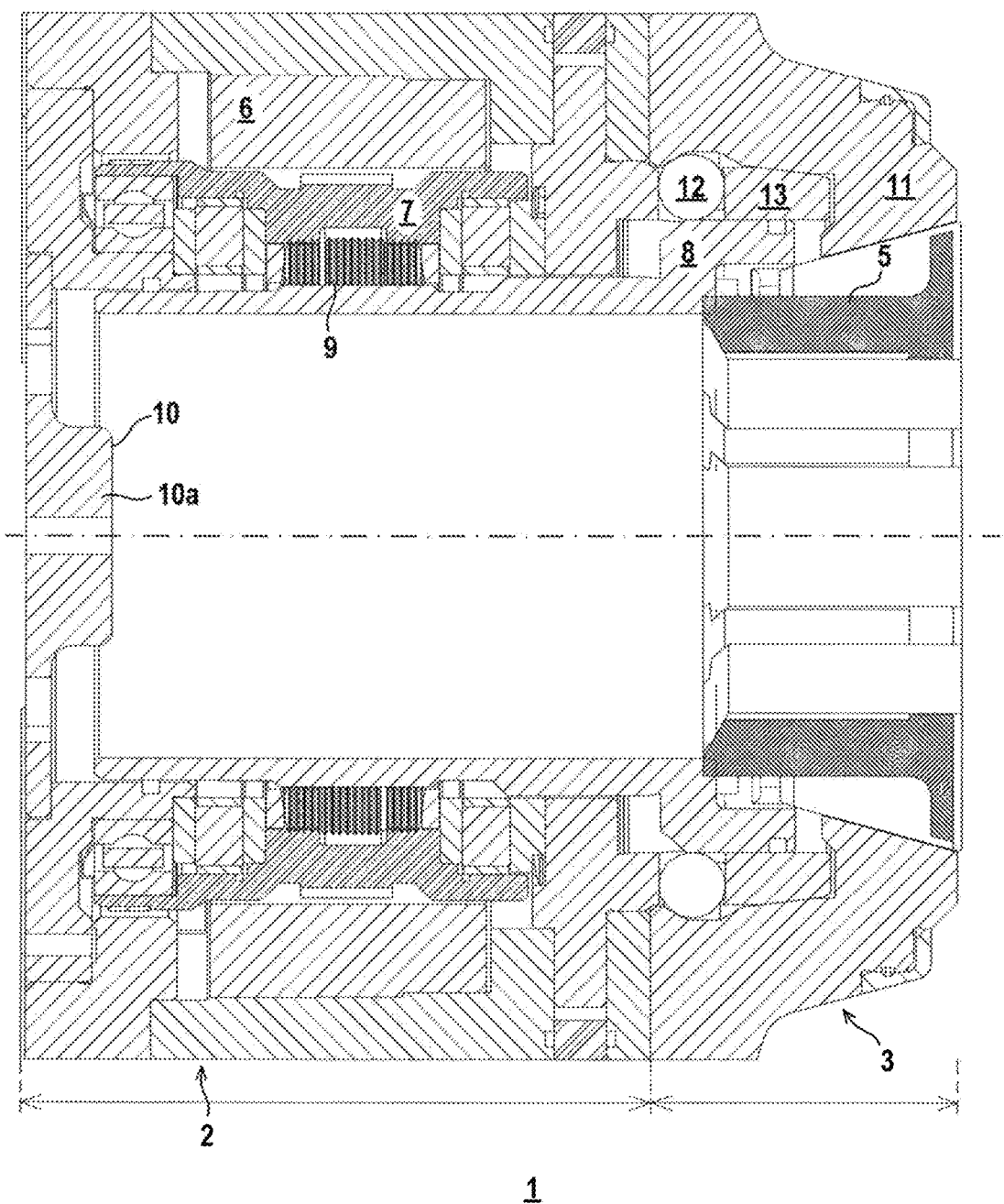
FIG. 2: Longitudinal sectional view of the clamping unit according to FIG. 1.

As can be seen from FIG. 2, an electric drive, which may, for example, consist of a servomotor, is integrated in base module 2 of clamping unit 1. The electric drive is controlled by a computer unit that is not shown here. The drive has, in the known manner, a stator 6 mounted stationarily in base module 2 and a rotatable rotor 7. Inside hollow-cylinder stator 6, rotor 7 is supported rotatably about an axis that is congruent with the symmetry axis of base module 2.

For performing clamping processes, an actuating element in the form of a pull rod 8 is provided, which is part of a gearbox unit associated with the electric drive. Pull rod 8 forms a hollow-cylinder body whose widened front end protrudes beyond the edge of base module 2 associated with interchangeable insert 3.

The gearbox unit is completed by the arrangement of rolling elements 9 which are distributed in the circumferential direction of rotor 7 or of pull rod 8. The rolling elements 9 engage, on the one hand, with rotor 7 and, on the other, with a thread on the outside of pull rod 8. The longitudinal axes of rolling elements 9 run parallel to the symmetry axis of base module 2. The rotational motion of rotor 7 causes rolling elements 9 to rotate and generate, via the engagement with the thread of pull rod 8, a translational motion of pull rod 8, which is used to clamp or release the workpiece in the clamping head.

FIG. 2 shows the situation of FIG. 1A, in which interchangeable insert 3 is supported in its target position on base module 2, with the interchangeable insert 3 being supported by the face of base module 2. At the rear edge of base module 2, there is a baseplate stop 10, whose planar top side forms a contact surface 10a on which the workpiece to be clamped can be set with its rear end extending into the hollow space of pull rod 8. Depending on the size of the workpiece, an adapter (not shown) may also be set on contact surface 10a, which adapter can support the rear end of the workpiece.

As can further be seen from FIG. 2, interchangeable insert 3 has a chuck body 11 having a conical recess opening at its front edge, which recess holds the clamping elements 5 forming the clamping head. Chuck body 11 also has an opening at its rear edge into which the widened front end of pull rod 8 extends.

Base module 2 supports an arrangement of identically shaped spheres 12 that form clamping elements by means of which a clamping connection is created between base module 2 and interchangeable insert 3. Spheres 12 form an annular configuration arranged in the circumferential direction of base module 2 at identical distances from each other. The number of spheres 12 depends on the size of base module 2.

As shown in FIG. 2, spheres 12 are supported between segments of base module 2 and chuck body 11. Further, spheres 12 also are in contact with the circumferential surface of pull rod 8. Alignment elements 13 having a conical shape are provided for correctly aligning spheres 12.

The functioning of clamping unit 1 is explained below, based on FIGS. 3A through 3C.

By means of the electric drive, pull rod 8 is moved in such a manner that the clamping elements 5 of the clamping head can be moved between a clamping position and a release position, and during this operation of clamping unit 1, interchangeable insert 3 is firmly held in its target position on base module 2 by the clamping effect of spheres 12.

Figure 3A:
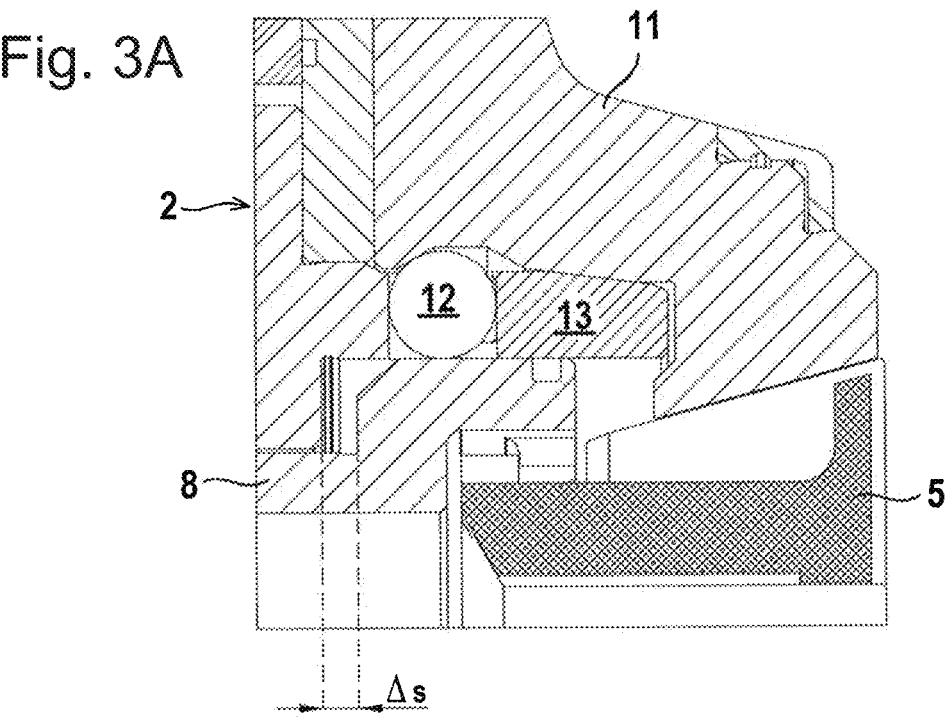
FIG. 3A: Detail view of the clamping unit with the front end of the pull rod and a sphere as a clamping element with the workpiece clamped

FIG. 3A shows the clamping position of clamping elements 5 which is arrived at by bringing pull rod 8, by means of the electric drive, into a first target position in which pull rod 8 extends far into base module 2, so that, due to a tensile effect of pull rod 8, clamping elements 5 are moved radially inward, thus clamping the workpiece (not shown). In this position, the distance As between the rear flank of the widening of pull rod 8 and the opposite wall segment of base module 2 is minimal.

The spheres 12 are now in contact with the respective segments of base module 2, with chuck body 11, and with pull rod 8, thus effecting the clamping between base module 2 and interchangeable insert 3.

The gearbox unit is configured to be self-locking, so that the clamping position is securely maintained even if the electric drive is shut off.

Figure 3B:
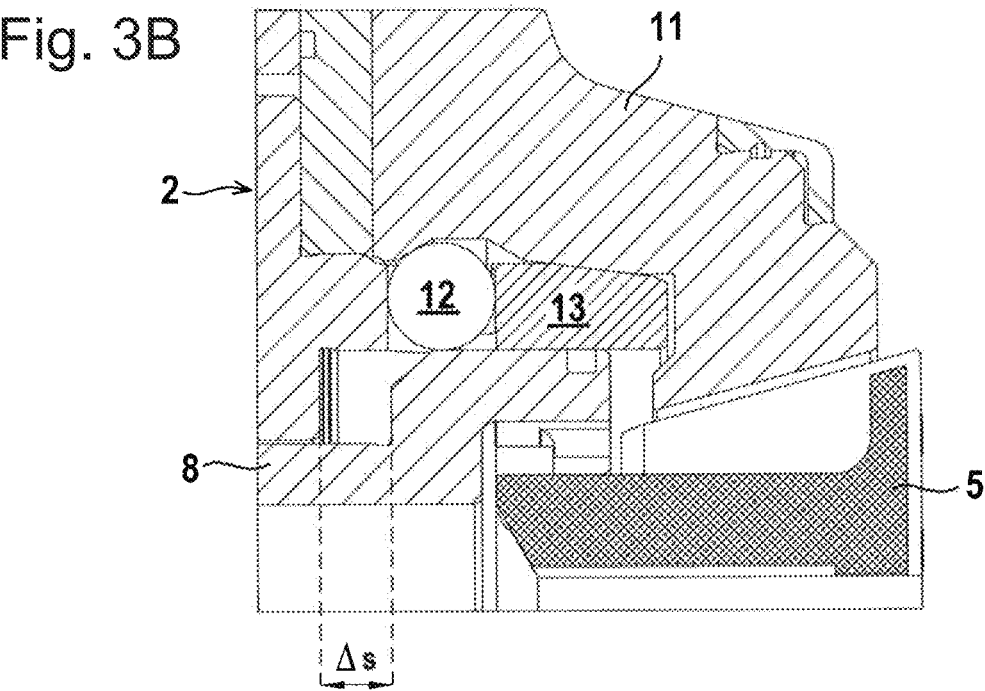
FIG. 3B: Detail view of the clamping unit with the front end of the pull rod and a sphere as a clamping element with the workpiece released

FIG. 3B shows the release position of clamping elements 5, in which the workpiece is released from the clamping head. For this purpose, by means of the electric drive, pull rod 8 has moved into a second target position in which it has moved further forward relative to the first target position, thus increasing distance As. Due to pull rod 8 moving into the second target position, clamping elements 5 are moved outward in the radial direction, thus releasing the workpiece.

The clamping effect of spheres 12 is also maintained in the second target position of pull rod 8 so that interchangeable insert 3 continues to be firmly attached to module 2.

Ultimately, as shown in FIG. 3C, by means of the electric drive, pull rod 8 can be advanced even further into a third target position so that distance Δs now assumes its maximum value.

This results in a distance Δx between the opposing walls of base module 2 and pull rod 8, and the clamping effect of spheres 12 is eliminated. Thus, interchangeable insert 3 is released from base module 2 and—by actuating the bayonet lock and by being twisted relative to base module 2 (as shown in FIG. 1B)—the insert can be rotated and then removed from the latter (as shown in FIG. 1C).

According to the invention, the operation of clamping unit 1 and, in particular, of the electric drive is electronically monitored and controlled by control means. For this purpose, a control unit is integrated into the computer unit, with which control unit the clamping force exerted by clamping elements 5 and/or the clamping position is set to specified target values.

According to a first variant, the control unit performs current/torque control of the electric drive; i.e., the current and the torque, as internal parameters of the electric drive, are used to specify target values for the control processes.

For specifying target values for the clamping force, force sensors may also be used, which are arranged in chuck body 11.

Sensors may also be used for monitoring the clamping position. Proximity switches on the limit stops of pull rod 8 are suited for this purpose. Alternatively, linear displacement measuring systems can also be used.

These sensors can reliably detect malfunctions during clamping and releasing of the workpiece. In addition, current limits can be provided in the control unit for detecting or compensating for malfunctions.

Finally, means of workpiece system control may be provided by means of which the correct contact of the workpiece at contact surface 10a of base stop plate 10 can be checked. For this purpose, inductive or capacitive sensors can be integrated into baseplate stop 10 by means of which the distances between contact surface 10a and the workpiece surface can be detected in specific locations.

LIST OF REFERENCE NUMERALS (1) Clamping unit
(2) Base module
(3) Interchangeable insert
(4) Locking element
(5) Clamping element
(6) Stator
(7) Rotor
(8) Pull rod
(9) Rolling element
(10) Baseplate stop
(10a) Contact surface
(11) Chuck body
(12) Sphere
(13) Aligning element

The invention claimed is:

1. Clamping unit (1) for clamping a workpiece with an electric drive and a gearbox unit having an arrangement of rolling elements (9), wherein a rotary motion can be converted to a translational motion of an actuating element by means of the gearbox unit, and wherein, by means of translational motions of the actuating element, clamping elements (5) can be moved into a clamping position in which a workpiece is clamped with clamping elements (5), and into a release position in which clamping elements (5) release the workpiece.

2. Clamping unit according to claim 1, characterized in that the actuating element is a pull rod (8).

3. Clamping unit according claim 1, characterized in that means of control for monitoring clamping position and clamping force are provided.

4. Clamping unit according to claim 3, characterized in that the means of control have a control unit that is associated with the electric drive.

5. Clamping unit according to claim 4, characterized in that the control unit regulates the current and torque of the electric drive.

6. Clamping unit according to claim 4, characterized in that regulation by the control unit is performed as a function of sensor signals from at least one force sensor.

7. Clamping unit according to claim 3, characterized in that at least one sensor is provided for monitoring the clamping position.

8. Clamping unit according to claim 7, characterized in that the sensor is a proximity switch or a linear displacement measuring system.

9. Clamping unit according to claim 1, characterized in that means of workpiece system control are provided by means of which the position of the workpiece relative to a contact surface (10a) can be controlled.

10. Clamping unit according to claim 9, characterized in that the means of workpiece system control has an arrangement of inductive or capacitive sensors.

11. Clamping unit according to claim 3, characterized in that the maintenance of the clamping force for clamping the workpiece is effected by self-locking of the gearbox unit.

12. Clamping unit according to claim 1, characterized in that it has a base module (2) in which the electric drive, the gearbox unit, and the actuating element are integrated, and it also has an interchangeable insert (3) with clamping elements (5) arranged therein.

13. Clamping unit according to claim 12, characterized in that interchangeable inserts, each with different clamping elements (5), can be attached to base module (2).

14. Clamping unit according to claim 12, characterized in that base module (2) and interchangeable insert (3) are connected to each other in a reversibly releasable manner by means of a bayonet lock.

15. Clamping unit according to claim 12, characterized in that base module (2) has an arrangement of spheres (12) that are means for forming a clamping connection with interchangeable insert (3).

16. Clamping unit according to claim 15, characterized in that spheres (12) form an annular arrangement that is symmetrical to the longitudinal axis of base module (2).

17. Clamping unit according to claim 15, characterized in that translational motions of the actuating elements effect or cancel the engagement of spheres (12) with interchangeable insert (3).

* * * * *